Figure 2:
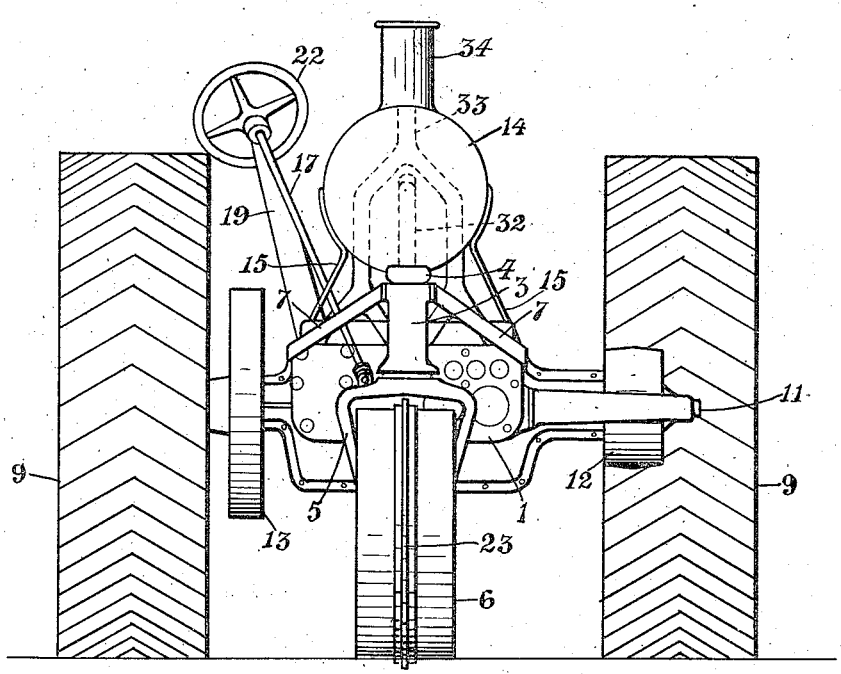

H. FORD.
TRACTION ENGINE.
APPLICATION FILED AUG. 19, 1910. RENEWED NOV. 11, 1914.
1,153,052.
Patented Sept. 7, 1915.
3 SHEETS—SHEET 1.
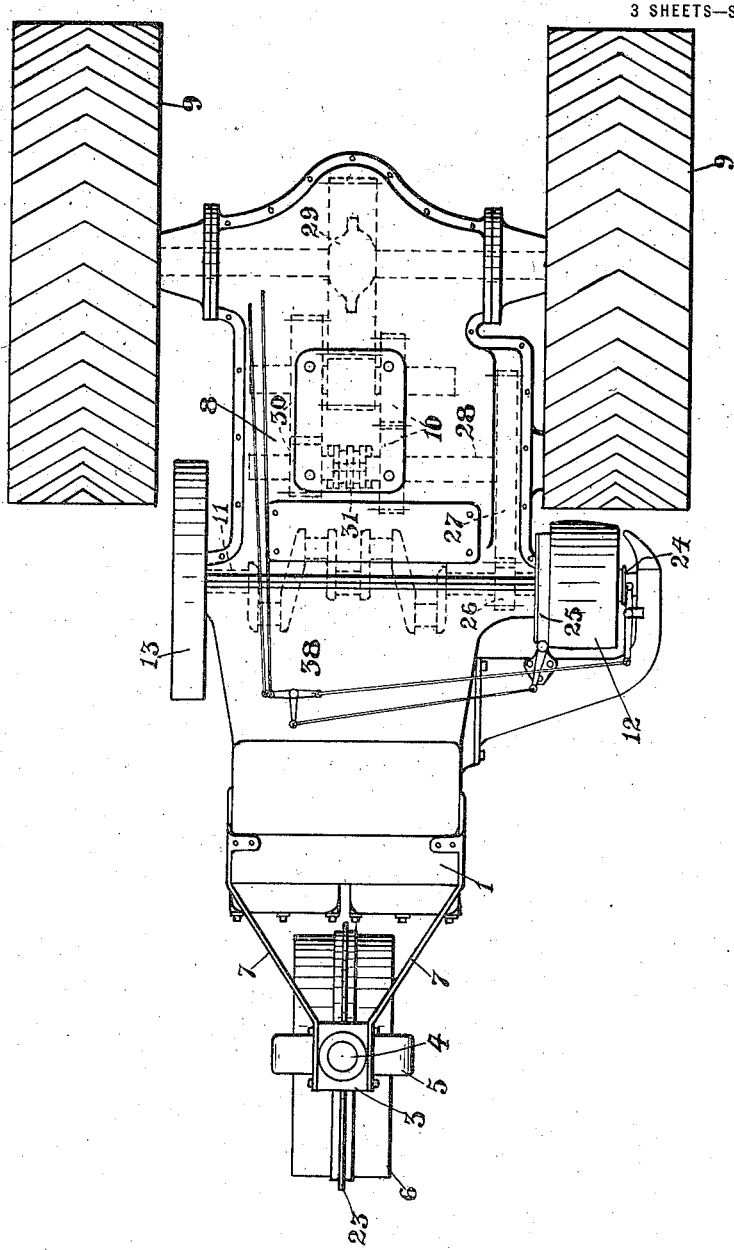
Fig. 1
Witnesses
C. M. Shannon
G. E. McGrann
Inventor
HENRY FORD
By 
Attorneys H. FORD.
TRACTION ENGINE.
APPLICATION FILED AUG. 19, 1910. RENEWED NOV. 11, 1914.

1,153,052.

Patented Sept. 7, 1915.
3 SHEETS—SHEET 2.

Witnesses
C. M. Shannon.
I. E. McGrann

Inventor
HENRY FORD
By
Attorneys

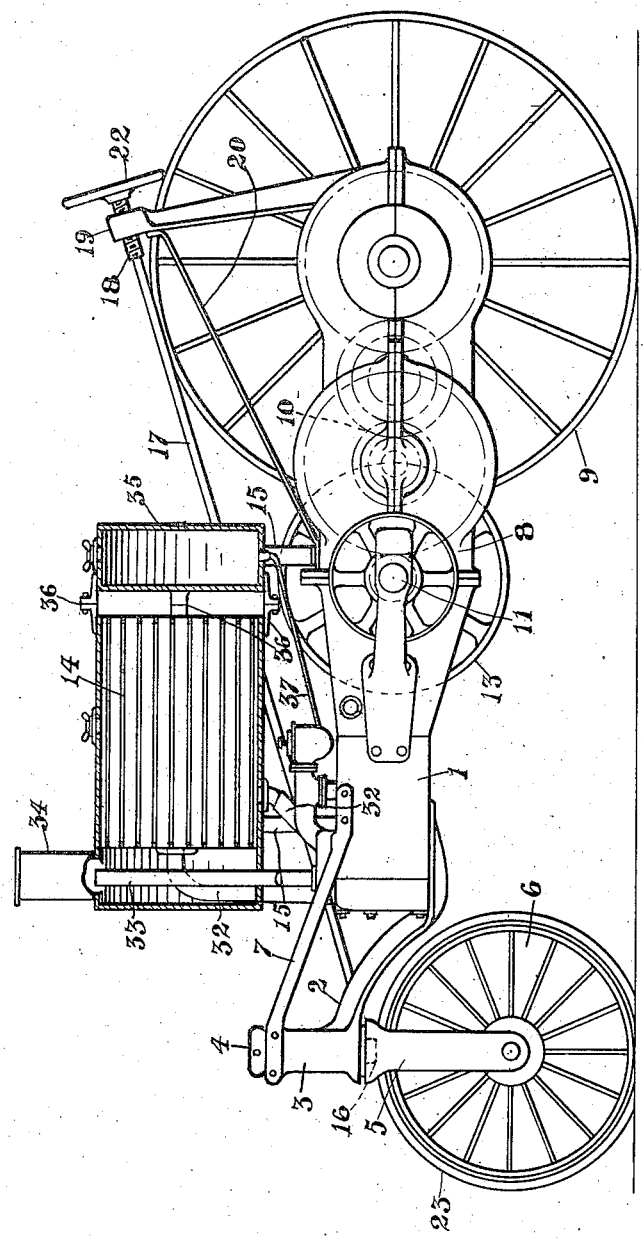

UNITED STATES PATENT OFFICE.

HENRY FORD, OF DETROIT, MICHIGAN.

TRACTION-ENGINE.

1,153,052. Specification of Letters Patent. Patented Sept. 7, 1915.

Application filed August 19, 1910, Serial No. 577,927. Renewed November 11, 1914. Serial No. 871,637.

*To all whom it may concern:*

Be it known that I, HENRY FORD, a citizen of the United States of America, residing at Detroit, in the county of Wayne and State of Michigan, have invented certain new and useful Improvements in Traction-Engines, of which the following is a specification, reference being had therein to the accompanying drawings.

This invention relates to tractors and more particularly to those of the internal combustion type especially adapted for field service, agricultural work and the like.

The object of the invention is to provide a tractor which works well on irregular ground such as tilled fields and the like and which is available also for use as a stationary motor.

The invention consists in the matters hereinafter set forth, and more particularly pointed out in the appended claims.

Referring to the drawings, Figure 1 is a plan view with parts omitted of a tractor that embodies features of the invention; Fig. 2 is a view in elevation of the front end of the tractor and Fig. 3 is a view in side elevation of a tractor with one wheel removed and with a radiator shown in longitudinal section.

As herein indicated, a motor, of the internal combustion reciprocating type, is disposed with its cylinders 1 in horizontal position, their forward ends being supported by a yoke 2 that has an upright bearing 3 in which the spindle 4 of a caster frame 5 is journaled. The latter is mounted on a forward steering or guide bearing wheel 6 centrally disposed in relation to the motor. The upper end of the bearing of the yoke is preferably stayed by braces 7 whose outer divergent ends are secured to the motor cylinders. A closed and extended crank case 8 that is secured rigidly to the crank ends of the cylinders of the motor forms therewith a hollow frame whose rear end is carried by a pair of traction bearing wheels 9. The latter are connected through differential and change speed mechanism housed in the extension and of any suitable type with the motor shaft 11 whose end portions project through the casing and carry pulleys 12 and 13 for transmitting power when the tractor is used as a stationary engine.

As a simple and preferred form of transmission, the pulley 12 is rotatable on the shaft with which it may be locked by any suitable clutch indicated at 24. A second clutch 25 is used to couple the pulley 12 with a pinion 26 rotatable on the motor shaft in mesh with a gear 27 secured to a counter-shaft 28 in the extension. The latter may be operatively connected with the drive member of a differential mechanism indicated at 29 between the traction wheels 9 through a reduction train 10 or another train 30 through the medium of a clutch 31.

A radiator 14, preferably of the cylindrical tubular type, is mounted on the casing over the cylinders on stanchions 15 and is operatively connected with the water jacket thereof through suitable pipes 32. The exhaust of the cylinders is carried through suitable manifolds to pipe 33 discharging through a draft pipe 34, and drawing air into the end of the radiator. A fuel tank 35 is connected by members 36 to the rear of the radiator at an interval therefrom. It is supported on the frame by the rear stanchion and supplies the motor carbureter through a pipe 37. A steering rod 17 is swiveled at one end to the caster frame at one side of the spindle 4 and carries a screw 18 at its other end which is reciprocable in a suitable interiorly screw-threaded bracket 19 mounted on the main frame adjacent the rear end thereof or at least in convenient reach of the operator's station. The bracket is stayed by suitable braces 20 and the steering stem or rod is rotated by a hand wheel 22. The guide bearing wheel has a peripheral flange 23 which prevents side skidding and aids it in guiding the machine. Suitable controlling members indicated in part at 38 run from the several clutches to the operator's station for convenient manipulation, of the tractor.

While herein shown with treads adapted for traction purposes, the main bearing wheels may have wider treads with smooth exteriors for use as road rollers and similarly the forward guide wheel may be extended laterally to overlap the tracks of the main traction wheels, the peripheral flange being omitted.

Obviously, changes in the details of construction may be made without departing from the spirit of the invention and I do not care to limit myself to any particular form or arrangement of parts.

What I claim as my invention is:—

1. A tractor comprising a substantially horizontal hollow frame, a reciprocating internal combustion motor whose running parts are housed in the frame and whose cylinders constitute the forward portion thereof, a pair of traction bearing wheels supporting the rear portion of the frame, means in the frame operatively connecting and disconnecting the motor and traction wheels, the frame forming a platform body rigidly holding the wheels in spaced relation and in which said means are housed, a pulley and clutch mechanism exteriorly of the housing, a bearing yoke extending forward from the cylinders, an upright caster frame swiveled in the yoke, and a caster bearing guide wheel pivotally mounted in the caster frame.

2. A tractor comprising a hollow, horizontally disposed frame whose forward end portion constitutes the horizontal cylinders of an internal combustion motor which are disposed longitudinally of the frame, the running parts of the motor being housed in the frame, a bearing yoke extending forward from the cylinders, an upright caster frame on which the yoke is pivotally mounted, a guide bearing wheel journaled in the caster frame, a pair of traction wheels on which the other end of the frame is supported, the frame forming a platform body rigidly holding the wheels in spaced relation, differential change speed mechanism within the hollow frame operatively connecting the motor and traction wheels to rotate the latter, means exteriorly of the frame for connecting and disconnecting the mechanism and motor and fast and loose pulleys on the motor shaft ends.

3. A tractor comprising a hollow frame whose end portion constitutes the cylinders of an internal combustion motor whose running parts are housed in the frame, a pair of traction bearing wheels supporting one end of the frame, a bearing yoke on which the other end is pivotally supported, a caster frame, a guide bearing wheel journaled in the caster frame, a steering rod longitudinally disposed in the frame in screw-threaded engagement with a bracket on the frame, and connections between the rod and caster frame to swing the latter when the rod is reciprocated in the bracket, the frame forming a platform body rigidly holding the wheels in spaced relation.

4. A tractor comprising a motor with horizontally disposed cylinders and extended crank case secured to the crank ends thereof, the cylinders and case forming a main frame, in which the main shaft of the motor is journaled, a power transmitting member rotatable on the frame, clutch mechanism for coupling the member and main shaft, traction bearing wheels supporting the frame, mechanism for driving the traction wheels housed in the case, and clutch mechanism for coupling the traction wheel driving mechanism with the member, the frame forming a platform body rigidly holding the wheels in spaced relation.

5. A tractor comprising a motor with horizontally disposed cylinders and extended crank case secured to the crank ends thereof, the cylinders and case forming a main frame in which the main shaft of the motor is journaled, a pulley journaled on the frame, a clutch for locking the pulley and main shaft to turn together, traction bearing wheels supporting the frame, change speed differential mechanism housed in the case for driving the wheels, and clutch mechanism for coupling the pulley and wheel driving mechanism, the frame forming a platform body rigidly holding the wheels in spaced relation.

6. A tractor comprising a motor with horizontally disposed cylinders and extended crank case secured to the crank ends thereof, the cylinders and case forming a main frame, in which the main shaft of the motor is journaled, a pulley journaled on the main shaft, a pinion journaled on the main shaft in the frame, change speed and differential gearing in the frame driven by the pinion, traction bearing wheels for the frame operated by the gearing, and clutch mechanism for coupling the shaft, pulley and pinion, the frame forming a platform body rigidly holding the wheels in spaced relation.

7. A tractor comprising a motor with horizontally disposed cylinders and extended crank case secured to the crank ends thereof, the cylinders and case forming a main frame in which the main shaft of the motor is journaled, a pulley journaled on the main shaft, a pinion journaled on the main shaft in the frame, change-speed and differential gearing in the frame driven by the pinion, traction bearing wheels for the frame operated by the gearing, clutch mechanism for coupling the pulley and shaft, and clutch mechanism for coupling the pinion and pulley, the frame forming a platform body rigidly holding the wheels in spaced relation.

8. A tractor comprising a motor whose horizontally disposed cylinders and crank case form the frame of the tractor, and whose main shaft extends beyond the case in which it is journaled, traction bearing wheels journaled on the case, change speed and differential mechanism housed in the case for driving the wheels, means on the extended portion of the shaft for transmitting power therefrom, clutch mechanism exteriorly of the frame for operatively connecting the shaft to said means and to the wheel driving mechanism, the frame forming a platform body rigidly holding the wheels in spaced relation and in which the operating means are housed, and a guide bearing wheel mounted to swing on a vertical pivot in advance of the cylinders for which it forms a support.

In testimony whereof I affix my signature in presence of two witnesses.

HENRY FORD.

Witnesses:
W. C. WHITE,
H. E. SCHLUCHTER.